United States Patent
Liao et al.

(10) Patent No.: US 7,667,742 B2
(45) Date of Patent: Feb. 23, 2010

(54) IMAGE PICKUP AND REPRODUCING APPARATUS

(75) Inventors: Baiping Liao, Saitama (JP); Ichiro Ueno, Saitama (JP)

(73) Assignee: Sony Corporation (JP)

( * ) Notice: Subject to any disclaimer, the term of this patent is extended or adjusted under 35 U.S.C. 154(b) by 489 days.

(21) Appl. No.: 11/595,244

(22) Filed: Nov. 9, 2006

(65) Prior Publication Data

US 2007/0109414 A1 May 17, 2007

(30) Foreign Application Priority Data

Nov. 11, 2005 (JP) ............................ P2005-327595

(51) Int. Cl.
*H04N 5/76* (2006.01)
(52) U.S. Cl. ................................. 348/231.3; 348/231.5
(58) Field of Classification Search ............... 348/231.3, 348/231.5
See application file for complete search history.

(56) References Cited

U.S. PATENT DOCUMENTS

2005/0183018 A1* 8/2005 Shinkai et al. ............... 715/723
2006/0112124 A1* 5/2006 Ando et al. .................. 707/101

FOREIGN PATENT DOCUMENTS

| JP | 2003-018506 A | 1/2003 |
|----|---------------|--------|
| JP | 2004-015378 A | 1/2004 |

* cited by examiner

*Primary Examiner*—James M Hannett
(74) *Attorney, Agent, or Firm*—Lerner, David, Littenberg, Krumholz & Mentlik, LLP

(57) ABSTRACT

An image pickup position information acquisition unit acquires, from a position fixing unit, position information of an image pickup location of a moving image being picked up. A preceding image pickup position information storage unit stores position information of a preceding image pickup location as preceding image pickup position information. A change point detector compares the image pickup position information and the preceding image pickup position information. If the position indicated by the image pickup position information is spaced apart from the position indicated by the preceding image pickup position information by a predetermined distance, the change point detector detects the current position as a change point. The change point is recorded onto a change point position information. Thumbnail data generated by a thumbnail generator is recorded as a change point thumbnail.

13 Claims, 15 Drawing Sheets

FIG. 5

| COMMON INFORMATION 610 | START TIME AT LOCATION A | END TIME AT LOCATION A |
| --- | --- | --- |
| PARTICULAR INFORMATION OF LOCATION A | START TIME AT LOCATION B | END TIME AT LOCATION B |
| PARTICULAR INFORMATION OF LOCATION B | START TIME AT LOCATION C | END TIME AT LOCATION C |
| PARTICULAR INFORMATION OF LOCATION C | ..... | |
| 620 | 601 | 602 |

| ITEM | SIZE (BYTES) |
|---|---|
| GPS TAG VERSION | 4 |
| GEODETIC SYSTEM | 7 |

FIG. 7

| ITEM | SIZE (BYTES) |
|---|---|
| 621 NORTHERN/SOUTHERN HEMISPHERE INDICATION | 2 |
| 622 LATITUDE | 24 |
| 623 EAST/WEST HEMISPHERE INDICATION | 2 |
| 624 LONGITUDE | 24 |
| 625 ALTITUDE INDICATION | 1 |
| 626 ALTITUDE | 8 |
| 627 GPS RECEIVER STATUS | 2 |
| 628 POSITION FIXING RELIABILITY | 8 |
| 629 POSITION FIXING TIME | 24 |
| 631 NUMBER OF SATELLITES IN USE | 3 |
| 632 GPS POSITION FIXING METHOD | 2 |
| 641 UNIT OF SPEED | 2 |
| 642 SPEED | 8 |
| 643 UNIT OF BEARING | 2 |
| 644 BEARING | 8 |
| 645 UNIT OF IMAGE DIRECTION | 2 |
| 646 IMAGE DIRECTION | 8 |

620, 630 (items 621-632), 640 (items 641-646)

IMAGE PICKUP AND REPRODUCING APPARATUS

CROSS REFERENCES TO RELATED APPLICATIONS

The present invention contains subject matter related to Japanese Patent Application JP 2005-327595 filed in the Japanese Patent Office on Nov. 11, 2005, the entire contents of which are incorporated herein by reference.

BACKGROUND OF THE INVENTION

1. Field of the Invention

The present invention relates to an apparatus for picking up and reproducing images and, in particular, to method and apparatus for picking images, method and apparatus for reproducing images, and method and apparatus for picking up and reproducing images, and programs for causing a computer to perform theses methods.

2. Description of the Related Art

Image pickup apparatuses for picking up moving images are in widespread use. A lot of users enjoy picking up moving images. Since the operation of the image pickup apparatus is easy, the user can shoot various landscapes, streets, etc. at will, and as a result, a vast amount of moving image data is accumulated.

When a vast amount of data is accumulated, the user cannot memorize locations of captured data even if the user shoots himself. It is thus necessary to associate pickup position with captured moving image data somehow. Japanese Unexamined Patent Application Publication No. 2003-18506 discloses a recording system that records video data captured by a camera and position data acquired from a global positioning system (GPS) with one associated with the other.

SUMMARY OF THE INVENTION

In accordance with the disclosed technique, the video data and the position data are recorded so that the position is displayed based on the position data during playback of the video data. With this known technique, recording timing of the position data is not known. If all position data is recorded at regular intervals during the shooting of the moving image, a large amount of memory size is consumed depending on the length of the intervals. If the position data is recorded on a per moving image file, accurate image pickup position cannot be recorded when shooting is performed with location shifted.

It is thus desirable to efficiently record the position information corresponding to the moving data and to precisely display the position data during playback.

In accordance with one embodiment of the present invention, an image pickup apparatus includes a moving image recording unit for recording a captured image as moving image data, an image pickup position information acquisition unit for acquiring, as image pickup position information, position information regarding an image pickup location during recording of the moving image data, a preceding image pickup position information storage unit for storing, as preceding image pickup position information, the image pickup position information acquired by the image pickup position information acquisition unit, a change point detecting unit for detecting a change point indicating that a position represented by the image pickup position information has changed from a position represented by the preceding image pickup position information, by comparing the image pickup position information with the preceding image pickup position information, and a change point position information recording unit for recording, as change point position information, the image pickup position information when the change point is detected, wherein the preceding image pickup position storage unit stores, as new preceding image pickup position information, the image pickup position information when the change point is detected. The change point is detected during the pickup of the moving image, and the position information at the change point is stored as the change point position information.

Since the change point position information is recorded with the moving image data associated therewith, the position information corresponding to the moving image data is efficiently recorded.

The change point detecting unit may detect the change point when a distance between the position represented by the image pickup position information and the position represented by the preceding image pickup position information increases above a predetermined distance or when a geographic name represented by the image pickup position information becomes different from a geographic name represented by the preceding image pickup position information.

The image pickup apparatus may further include a position measurement timer for counting a time interval between acquisitions of the image pickup position information, wherein the image pickup position information acquisition unit acquires the image pickup position information each time the position measurement timer counts the acquisition interval. The position information is thus acquired at the constant intervals.

The image pickup apparatus may further include a motion status measurement unit for measuring a motion status of the image pickup apparatus during image pickup of a moving image, the motion status including information regarding one of a speed and an acceleration of the image pickup apparatus, wherein the change point position information recording unit records, as a portion of the change point position information, the motion status when the change point is detected. The motion status is recorded as the portion of the change point position information.

The image pickup apparatus may further include a representative image generating unit for generating, as a representative image, a contracted image of a moving image being picked up when the change point is detected, and a change point representative image recording unit for recording the representative image as a change point representative image. The representative image at the change point is recorded. The change point position information and the change point representative image may be recorded together with the captured moving image data as information (metadata) incidental to the moving image data.

In accordance with another embodiment of the present invention, a moving image reproducing apparatus includes a moving image playback unit for reproducing moving image data, a playback position information acquisition unit for acquiring, as playback position information, position information corresponding to playback time of the moving image data reproduced by the moving image playback unit, a geographical name information acquisition unit for acquiring geographical name information corresponding to the playback position information, and a display unit for displaying the moving image data together with a geographical name contained in the geographical name information. The geographical name information is thus acquired and displayed each time the position of the apparatus changes as the playback of the moving image is in progress.

The moving image reproducing apparatus may further include a preceding playback position information storage unit for storing, as preceding playback position information, position information preceding the playback time, and a playback position information comparing unit for detecting an unmatch by comparing the playback position information with the preceding playback position information, wherein the geographical name information acquisition unit acquires the geographical name information when the unmatch is detected, and wherein the preceding playback position information storage unit stores, as new preceding playback position information, the playback position information when the unmatch is detected. With this arrangement, the geographical name is acquired and then displayed in response to the occurrence of the unmatch of the position information.

The moving image reproducing apparatus may further include a display update timer for counting acquisition intervals of the playback position information, wherein the playback position information acquisition unit acquires the playback position information each time the display update timer counts each acquisition interval. The position information is thus acquired at the constant intervals.

The moving image reproducing apparatus may further include a geographical name information storage unit for storing the geographical name information corresponding to the position information, wherein the geographical name information acquisition unit acquires the geographical name information corresponding to the playback position information by searching the geographical name information storage unit. The moving image reproducing apparatus alone acquires the geographical name information without using an external database. The geographical name information storage unit may store, as the geographical name information, a geographical name corresponding to a pair of latitude and longitude or a geographical name belonging to an area defined by a plurality of pairs of latitudes and longitudes. The use of the geographical name belonging to the area defined by the plurality of pairs of latitudes and longitudes provides more accurate geographical name information, but consumes more memory capacity of the geographical name information storage unit.

In accordance with another embodiment of the present invention, a moving image reproducing apparatus includes an incidental information storage unit for storing a contracted image of moving image data at a predetermined time and position information of an image pickup location of the contracted image with the contracted image associated with the position information, a geographical name information acquisition unit for acquiring geographical name information corresponding to the position information, a display unit for displaying the contracted image together with a geographical name contained in the geographical name information, an operation unit for receiving a selection command of the contracted image displayed on the display unit, and a moving image playback unit for reproducing the moving image data starting at time corresponding to the contracted image selected by the selection command. The moving image data is reproduced by selecting the contracted image displayed together with the geographical name.

In accordance with another embodiment of the present invention, a moving image pickup and reproducing apparatus includes a moving image recording unit for recording a captured image as moving image data, an image pickup position information acquisition unit for acquiring, as image pickup position information, position information regarding an image pickup location during recording of the moving image data, a preceding image pickup position information storage unit for storing, as preceding image pickup position information, the image pickup position information acquired by the image pickup position information acquisition unit, a change point detecting unit for detecting a change point indicating that a position represented by the image pickup position information has changed from a position represented by the preceding image pickup position information, by comparing the image pickup position information with the preceding image pickup position information, a change point position information recording unit for recording, as change point position information, the image pickup position information when the change point is detected, a moving image playback unit for reproducing the moving image data recorded on the moving image recording unit, a playback position information acquisition unit for acquiring, as playback position information, the change point position information corresponding to playback time of the moving image data reproduced by the moving image playback unit, a geographical name information acquisition unit for acquiring geographical name information corresponding to the playback position information, and a display unit for displaying the moving image data together with a geographical name contained in the geographical name information. With this arrangement, the change point is detected during the pickup of the moving image, the position information is recorded as the change point position information. During the playback of the moving image, the geographical name information is acquired and displayed each time the position changes with the progress of the playback of the moving image.

In accordance with another embodiment of the present invention, a moving image pickup and reproducing apparatus includes a moving image recording unit for recording a captured image as moving image data, an image pickup position information acquisition unit for acquiring, as image pickup position information, position information regarding an image pickup location during recording of the moving image data, a preceding image pickup position information storage unit for storing, as preceding image pickup position information, the image pickup position information acquired by the image pickup position information acquisition unit, a change point detecting unit for detecting a change point indicating that a position represented by the image pickup position information has changed from a position represented by the preceding image pickup position information, by comparing the image pickup position information with the preceding image pickup position information, a change point position information recording unit for recording, as change point position information, the image pickup position information when the change point is detected, a representative image generating unit for generating, as a representative image, a contracted image of the moving image being picked up when the change point is detected, a change point representative image recording unit for recording the representative image as a change point representative image, a geographical name information acquisition unit for acquiring geographical name information corresponding to the change point position information, a display unit for displaying the change point representative image, corresponding to the change point position information, together with a geographical name contained in the geographical name information, an operation unit for receiving a selection command of the contracted image displayed on the display unit, and a moving image playback unit for reproducing the moving image data starting at time corresponding to the change point representative image selected by the selection command, wherein the preceding playback position information storage unit stores, as new preceding playback position information, the image pickup position information when the change point is detected. With this arrangement, the change point is detected during the pickup of the moving image, and the position information and the contracted image are recorded. By selecting the contracted image displayed together with the geographical name acquired based on the position information, the moving image data is reproduced.

In accordance with one embodiment of the present invention, each of an image pickup method and a computer program for causing a computer to perform the image pickup method includes the steps of acquiring, as image pickup position information, position information regarding an image pickup location when a captured image is recorded as moving image data, detecting a change point indicating that a position represented by the image pickup position information has changed from a position represented by image pickup position information preceding the first image pickup position information, by comparing the image pickup position information with the preceding image pickup position information, and recording, as change point position information, the image pickup position information when the change point is detected. The change point is detected during the pickup of the moving image, and the position information then obtained is recorded as the change point position information.

In accordance with another embodiment of the present invention, each of a reproducing method and a program for causing a computer to perform the method includes the steps of acquiring, as playback position information, position information corresponding to playback time of moving image data, detecting an unmatch by comparing the playback position information with playback position information preceding the first playback position information, acquiring geographical name information corresponding to the playback position information when the unmatch is detected, and displaying the moving image data together with a geographical name contained in the geographical name information. Each time the position changes with the progress of the playback of the moving image, the geographical name information is acquired and displayed.

In accordance with embodiments of the present invention, the position information corresponding to the moving image data is efficiently recorded, and the position information is precisely displayed during playback.

BRIEF DESCRIPTION OF THE DRAWINGS

FIG. 5 illustrates a data structure of position information in accordance with one embodiment of the present invention;

FIG. 6 illustrates a data structure of common information of the position information in accordance with one embodiment of the present invention;

FIG. 7 illustrates a data structure of particular information of the position information in accordance with one embodiment of the present invention;

DESCRIPTION OF THE PREFERRED EMBODIMENTS

The embodiments of the present invention are described below with reference to the drawings.

Figure 1:
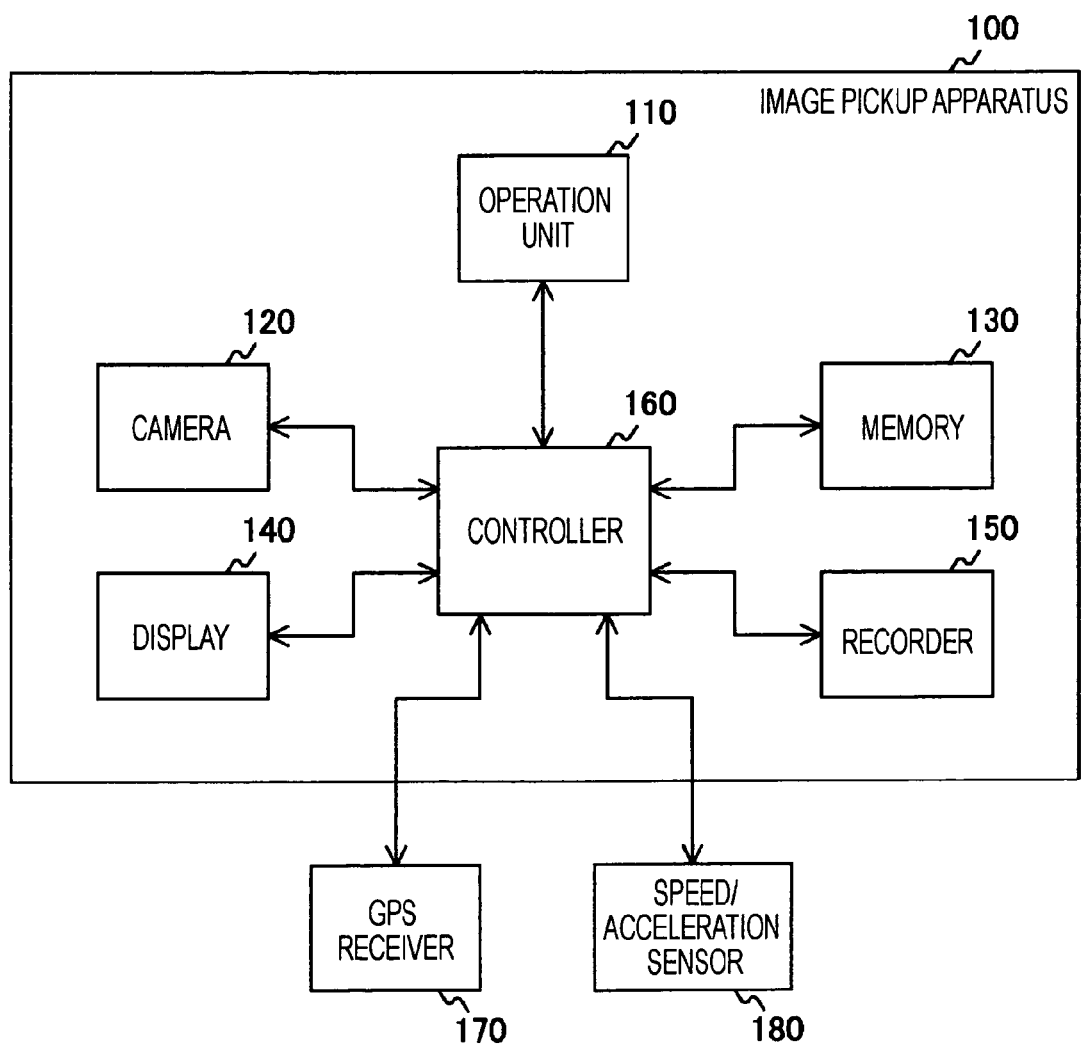
FIG. 1 is a block diagram of an image pickup apparatus of one embodiment of the present invention.

FIG. 1 is a block diagram of an image pickup apparatus 100 in accordance with one embodiment of the present invention. The image pickup apparatus 100 includes an operation unit 110, a camera 120, a memory 130, a display 140, a recorder 150, and a controller 160.

The operation unit 110 for receiving an operation input from a user includes operation buttons mounted on the image pickup apparatus 100, and a touchpanel integrally mounted on the display 140.

The camera 120 picks up an image of a subject, and includes an optical block such as lens, and a signal converter such as a charge-coupled device (CCD). The memory 130 serves as a working memory temporarily storing moving image data captured by the camera 120, and is typically a volatile memory.

The display 140, such as a liquid-crystal display (LCD), displays a moving image being picked up or a playback moving image thereon, and may be integrally formed with the operation unit 110.

The recorder 150 records the captured moving image data and information incidental to the moving image data, and is typically a non-volatile memory. The controller 160 controls each block of the image pickup apparatus 100, and is typically a program-controlled microcomputer.

The image pickup apparatus 100 may include or may be connected to a GPS receiver 170 and a speed/acceleration sensor 180. The GPS receiver 170 receives position information relating to the position of the image pickup apparatus 100 from GPS satellites. The speed/acceleration sensor 180 detects speed and acceleration of the image pickup apparatus 100, and is typically composed of a gyro-sensor detecting angular speed and an acceleration sensor detecting acceleration.

Figure 2:
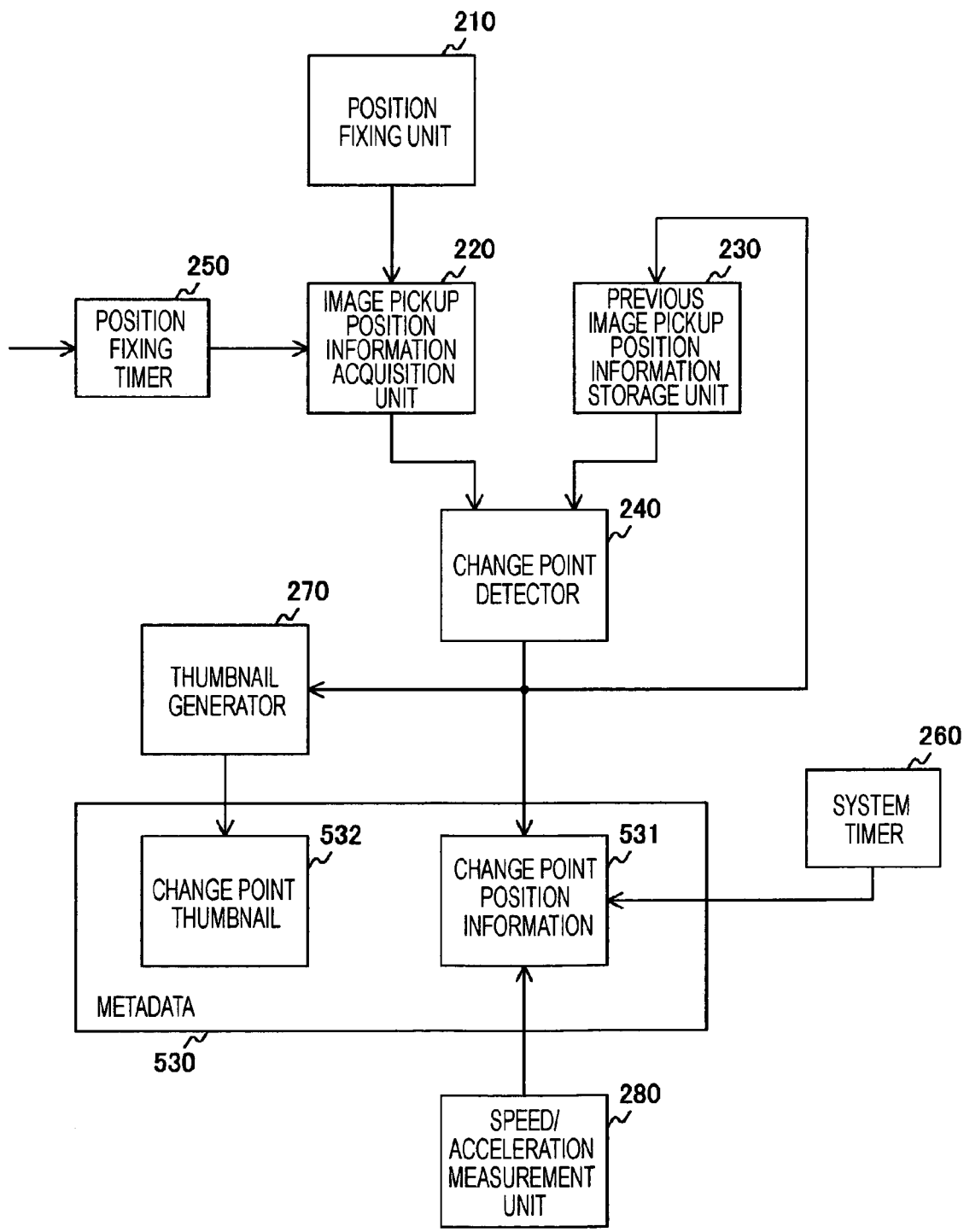
FIG. 2 is a functional block diagram illustrating the image pickup apparatus of the embodiment of the present invention for recording a moving image.

FIG. 2 is a functional block diagram illustrating the arrangement for recording the moving image of the image pickup apparatus 100. There are shown a position fixing unit 210, an image pickup position information acquisition unit 220, a preceding image pickup position information storage unit 230, a change point detector 240, a position fixing timer 250, a system timer 260, a thumbnail generator 270, and a speed/acceleration measurement unit 280.

The position fixing unit 210 fixes a present position of the image pickup apparatus 100, and for example, uses the GPS external to the image pickup apparatus 100. The image pickup position information acquisition unit 220 acquires, from the position fixing unit 210, the position information of the image pickup location where a moving image is being picked up. The image pickup position information acquisition unit 220 corresponds to the GPS receiver 170 of FIG. 1. The preceding image pickup position information storage unit 230 stores, as preceding image pickup position information, the position information of the image pickup location acquired by the image pickup position information acquisition unit 220. The position information may be latitude and longitude information acquired from the GPS receiver 170, or may be geographical name information relating to a country name, a city name, and a geographical name acquired using a geographic name information database 700 to be discussed later with reference to FIG. 8.

The change point detector 240 compares the image pickup position information acquired by the image pickup position information acquisition unit 220 with the preceding image pickup position information stored by the preceding image pickup position information storage unit 230. When a position represented by the image pickup position information has changed from a position represented by the preceding image pickup position information, the change point detector 240 detects the position represented by the image pickup position information as a "change point." For example, the change point detector 240 may compare information of latitude and longitude stored by the preceding image pickup position information storage unit 230 with information of latitude and longitude represented by the image pickup position information, and detects as the change point if the two positions are spaced apart by a predetermined distance or more. Alternatively, the change point detector 240 compares a geographical name stored by the preceding image pickup position information storage unit 230 with a geographical name represented by the image pickup position information and detects as the change point if the two geographical names are different. The predetermined distance may be as long as a distance across which corresponding geographical names corresponding to the position information change, and may be from several hundred meters to several kilometers.

If the change point is detected, the change point detector 240 causes the preceding image pickup position information storage unit 230 to store the position indicated by the image pickup position information as new preceding image pickup position information. When the recording of the moving image data starts, the preceding image pickup position information storage unit 230 may store the image pickup position information at the start of the recording as the preceding image pickup position information.

When the change point detector 240 detects the change point, the image pickup position information acquired by the image pickup position information acquisition unit 220 is stored on the preceding image pickup position information storage unit 230 as new preceding image pickup position information. In this case, the image pickup position information acquired by the image pickup position information acquisition unit 220 is recorded on as change point position information 531 in metadata 530. A contracted image of a moving image being picked up corresponding to the change point position information 531 is generated by a thumbnail generator 270 as a thumbnail (representative image), and then recorded as change point thumbnail 532 in the metadata 530.

The position fixing timer 250 counts acquisition intervals of the position information of the image pickup position information acquisition unit 220. The image pickup position information acquisition unit 220 can acquire the position information from the position fixing unit 210 at regular intervals.

The system timer 260 measures the present time. The present time provided by the system timer 260 is recorded as part of the change point position information 531 or as information incidental to the change point position information 531.

The thumbnail generator 270 generates as the thumbnail the contracted image of the moving image being picked up when the change point is detected by the change point detector 240. The thumbnail generated by the thumbnail generator 270 is recorded on the change point thumbnail 532.

The speed/acceleration measurement unit 280 detects a motion status such as the speed and acceleration of the image pickup apparatus 100, and corresponds to the speed/acceleration sensor 180 of FIG. 1. The speed/acceleration measurement unit 280 may thus include a gyro sensor measuring angular speed and an acceleration sensor measuring acceleration.

The metadata 530 includes information incidental to the moving image data, such as the change point position information 531 and the change point thumbnail 532. The data structure of the metadata 530 will be described later.

Figure 3:
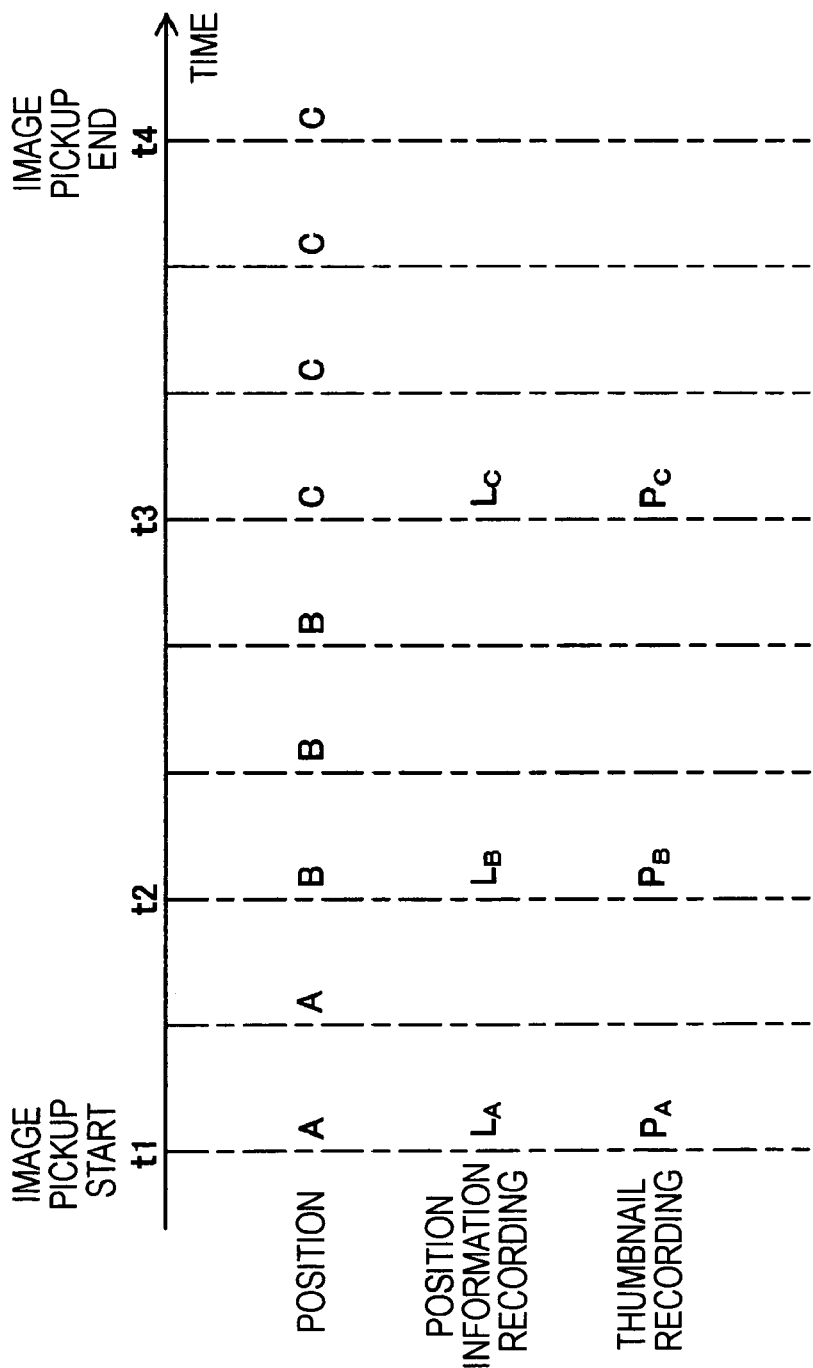
FIG. 3 illustrates recording timing of metadata in accordance with one embodiment of the present invention.

FIG. 3 illustrates recording timing of the metadata 530 in accordance with one embodiment of the present invention. The image pickup apparatus 100 picks up the moving image from time t1 to time t4. The image pickup position information acquisition unit 220 acquires the position information from the position fixing unit 210 at regular intervals defined by the position fixing timer 250.

When image pickup starts at time t1, the image pickup position information acquisition unit 220 acquires the position information at position A and records the position information as change point position information $L_A$. The thumbnail generator 270 generates a thumbnail and records the generated thumbnail as change point thumbnail $P_A$. After a constant time elapse, the image pickup position information acquisition unit 220 acquires position information, but records no metadata because the present position is not far from a preceding position by a predetermined distance.

After another constant time elapse, the image pickup position information acquisition unit 220 acquires position information at time t2. Since the present position is far from the preceding position A by a predetermined distance, the acquired position information at position B is recorded as change point position information $L_B$. The thumbnail generator 270 generates a thumbnail, which is then recorded as a change point thumbnail $P_B$.

The above operation is repeated. When the image pickup position information acquisition unit 220 acquires position information at time t3, the present position is far from the preceding position B by the predetermined distance. The acquired position information at position C is recorded as change point position information $L_C$. The thumbnail generator 270 generates a thumbnail, which is then recorded as change point thumbnail $P_C$.

Each time the present position is far from the preceding position by the predetermined distance, the position information and the thumbnail are recorded. Metadata is thus efficiently recorded.

Figure 4:
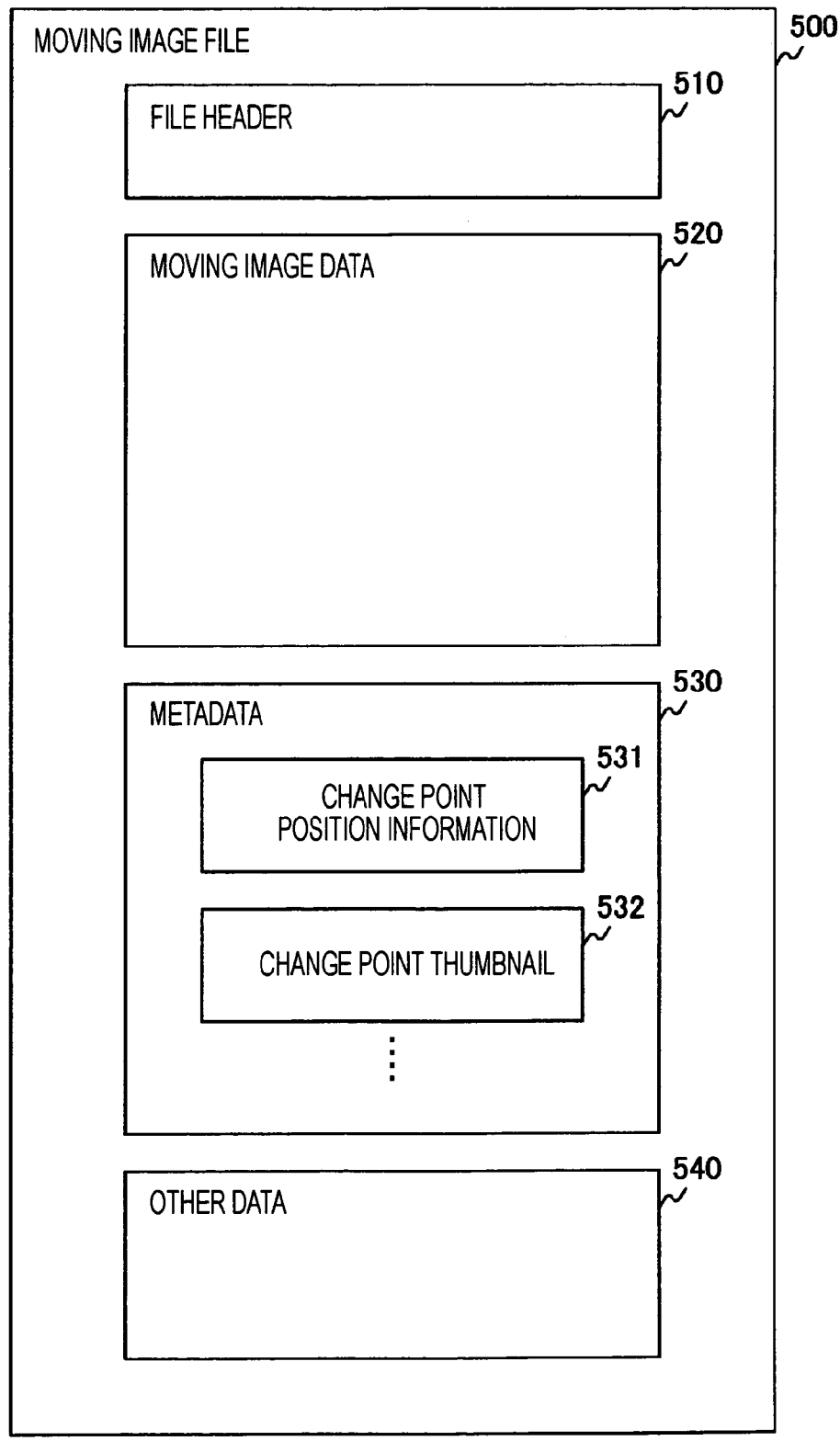
FIG. 4 illustrates a file structure of a moving image file in accordance with one embodiment of the present invention.

FIG. 4 illustrates a file structure of a moving image file 500 in accordance with one embodiment of the present invention. The moving image file 500 includes a file header 510, moving image data 520, metadata 530, and other data 540.

The file header 510 stores header information of the moving image file 500, and thus stores positions (addresses) of the moving image data 520 and the metadata 530 in the moving image file 500. The moving image data 520 includes a content of a moving image in a compression system such as moving picture experts group (MPEG).

The metadata 530 contain information incidental to the moving image data 520, and includes the change point position information 531 and the change point thumbnail 532. The change point position information 531 contains the position information of the image pickup apparatus 100 when the change point detector 240 detects the change point. The change point thumbnail 532 contains a thumbnail of a moving image being picked up when the change point detector 240 detects the change point.

FIG. 5 illustrates a data structure of position information 600 in accordance with one embodiment of the present invention. The position information 600 recorded in the change point position information 531 of FIG. 4 includes particular information 620, start time 601, and end time 602.

The common information 610 contains information common to the entire position information 600. The particular information 620 relates to information particular to each change point. The start time 601 and the end time 602 indicate start time and end time of a moving image corresponding to the particular information 620, respectively.

The position information 600 contains the particular information 620 of a plurality of image pickup positions and start times and end times of moving images thereof.

FIG. 6 illustrates a data structure of the common information 610 of the position information 600 in one embodiment of the present invention. The common information 610 contains GPS tag version 611 of 4 bytes (1 byte being 8 bits), and geodetic system 612 of 7 bytes.

The GPS tag version 611 indicates a version of a format used in the particular information 620. The geodetic system 612 indicates a geodetic system of latitude and longitude used in the particular information 620. The geodetic system 612 may be one of Tokyo Datum and World Geodetic System WGS-84.

FIG. 7 illustrates a data structure of the particular information 620 of the position information 600 in accordance with one embodiment of the present invention. The particular information 620 contains essential items 630 of 100 bytes and optional items 640 of 30 bytes.

The essential items 630 include northern/southern hemisphere indication 621 of 2 bytes, latitude 622 of 24 bytes, east/west hemisphere indication 623 of 2 bytes, longitude 624 of 24 bytes, altitude indication 625 of 1 byte, altitude 626 of 8 bytes, GPS receiver status 627 of 2 bytes, position fixing reliability 628 of 8 bytes, position fixing time 629 of 24 bytes, number of satellites in use 631 of 3 bytes, and GPS position fixing method 632 of 2 bytes. These pieces of data are measured by the position fixing unit 210.

The latitude 622 indicates a latitude fixed by the GPS. The northern/southern hemisphere indication 621 indicates whether the fixed position is in the northern hemisphere or the southern hemisphere. The longitude 624 indicates a longitude fixed by the GPS. The east/west hemisphere indication 623 indicates whether the fixed position is in the east hemisphere or the west hemisphere. The altitude 626 indicates an altitude fixed by the GPS. The altitude indication 625 indicates whether the altitude 626 is above sea level or not.

The GPS receiver status 627 indicates whether the GPS position fixing is the success or failure. The position fixing reliability 628 indicates a dilution of precision (DOP) at position fixing, namely, degree of degradation of position fixing accuracy, and an index representing one of four levels (A through D, for example). The position fixing time 629 indicates time of GPS fix. The satellites in use 631 indicates the number of GPS satellites used in position fixing. The GPS position fixing method 632 indicates a difference between two-dimensional fixing or three-dimensional fixing.

The optional items 640 includes unit of speed 641 of 2 bytes, speed 642 of 8 bytes, unit of bearing 643 of 2 bytes, bearing 644 of 8 bytes, unit of image direction 645 of 2 bytes, and image direction 646 of 8 bytes. These pieces of data are measured by the speed/acceleration measurement unit 280.

The speed 642 indicates a measured speed of the image pickup apparatus 100. The unit of speed 641 indicates the unit of the speed indicated by the speed 642. The bearing 644 indicates the bearing in which the image pickup apparatus 100 moves. The unit of bearing 643 indicates the unit of the bearing 644. The image direction 646 indicates the direction from which the image is picked up. The unit of image direction 645 indicates the unit of the image direction 646.

Figure 8:
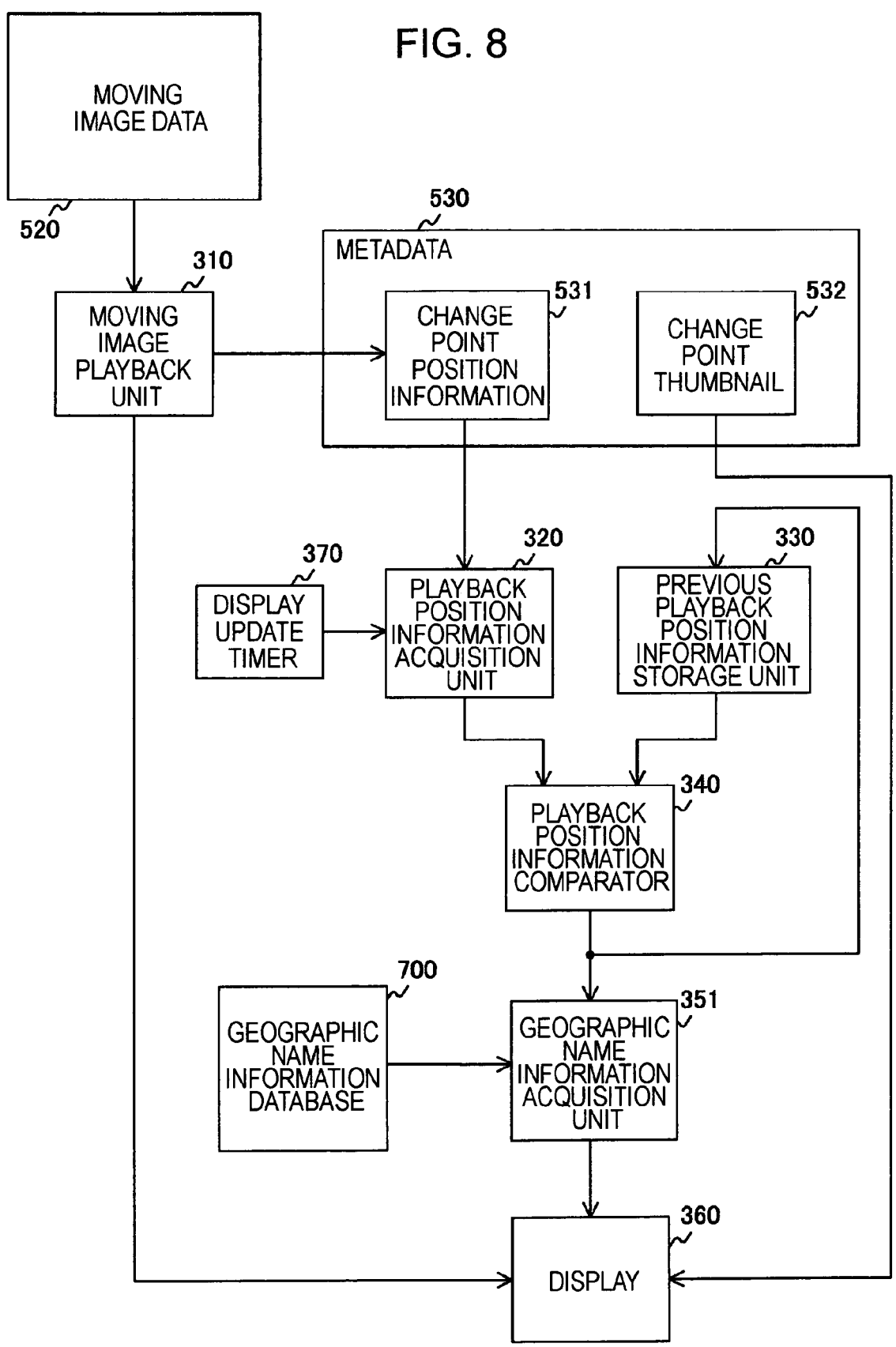
FIG. 8 is a block diagram of the image pickup apparatus in accordance with one embodiment of the present invention for reproducing a moving image.

FIG. 8 is a functional block diagram of an arrangement for reproducing a moving image of the image pickup apparatus 100. There are shown a moving image playback unit 310, a playback position information acquisition unit 320, a preceding playback position information storage unit 330, a playback position information comparator 340, a geographic name information acquisition unit 351, a display 360, a display update timer 370, and a geographic name information database 700.

The moving image playback unit 310 reproduces a moving image of the moving image data 520. The playback time of the moving image reproduced by the moving image playback unit 310, namely, time corresponding to a portion of the moving image being reproduced serves as an index of the change point position information 531.

The playback position information acquisition unit 320 indexes the change point position information 531 using the playback time of the moving image of the moving image playback unit 310, thereby acquiring as playback position information the position information of the playback portion of the moving image. More specifically, by comparing the start time 601 and the end time 602 in the position information 600 with the playback time, the corresponding portion of the moving image is identified, and the particular information of the corresponding location is thus acquired.

The preceding playback position information storage unit 330 stores, as preceding playback position information, position information preceding the playback time of the moving image reproduced by the moving image playback unit 310. The playback position information comparator 340 compares the playback position information acquired by the playback position information acquisition unit 320 with the preceding playback position information stored by the preceding playback position information storage unit 330, thereby detecting an unmatch therebetween.

If the playback position information comparator 340 detects an unmatch, the playback position information acquired by the playback position information acquisition unit 320 is stored as new preceding playback position information onto the preceding playback position information storage unit 330.

The geographic name information database 700 stores the geographical name information and the position information in association with the geographical name information. When the playback position information comparator 340 detects an unmatch, the geographic name information acquisition unit 351 indexes the geographic name information database 700 by the playback position information acquired by the playback position information acquisition unit 320, thereby acquiring related geographical name information.

The display 360 displays a moving image, reproduced by the moving image playback unit 310, together with a geographical name contained in the geographical name information acquired by the geographic name information acquisition unit 351. To display the geographical name, the display 360 may employ an on screen display (OSD) circuit. The display 360 may also display the latitude, longitude, altitude, speed, bearing, and image direction, contained in the playback position information, together with the geographical name. Furthermore, the display 360 may display the thumbnail, recorded in the change point thumbnail 532, together with the geographical name information and the position information.

The display update timer 370 counts time between acquisition intervals of the playback position information to update the display on the display 360. Each time the display update timer 370 counts the time between acquisition intervals, the playback position information acquisition unit 320 acquires the playback position information from the change point position information 531.

Figure 9:
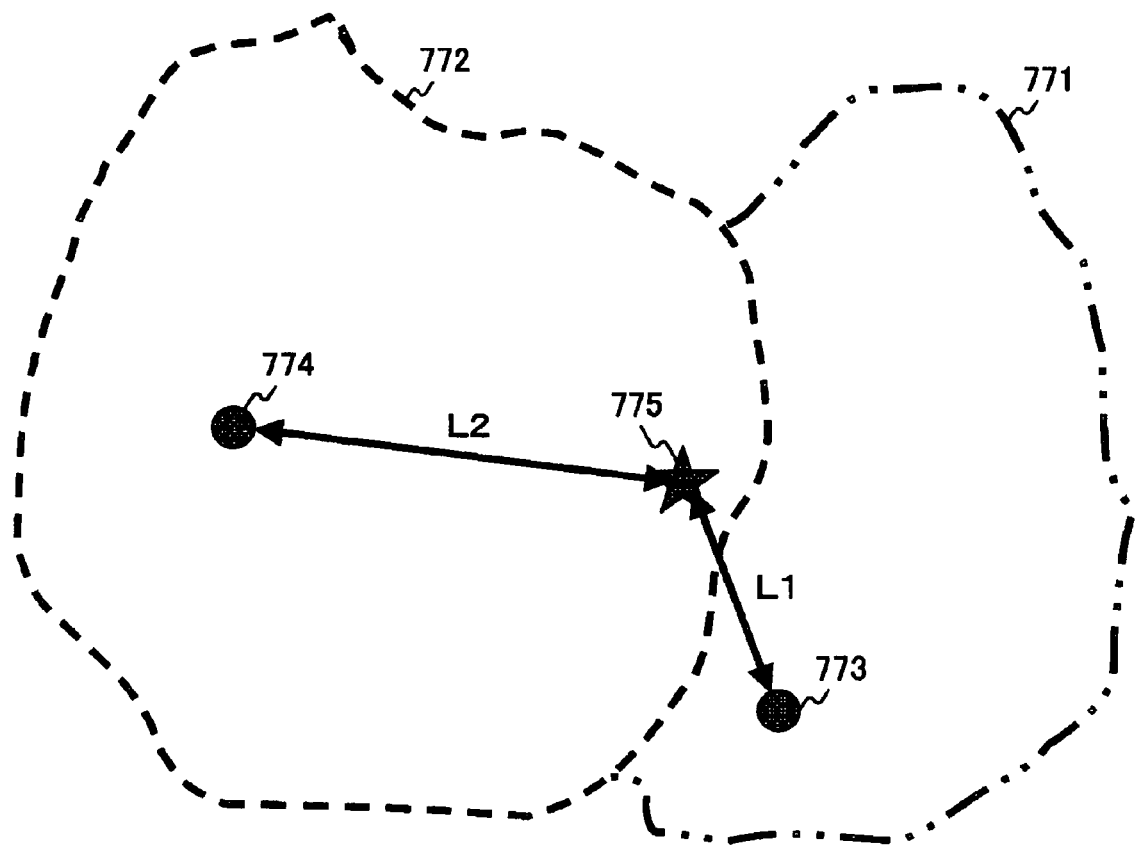
FIG. 9 illustrates operation of a geographic name information acquisition unit for acquiring geographic information in accordance with one embodiment of the present invention.

FIG. 9 illustrates how the geographic name information acquisition unit 351 acquires the geographical name information in accordance with one embodiment of the present invention. When the geographical name information of a target location 775 is acquired, a first location 773 and a second location 774 are candidates. If the shortest distance is simply used as a guide, the geographical name information of the first location 773 is acquired because a distance L1 to the first location 773 is shorter than a distance L2 to the second location 774.

There exist a first area 771 containing the first location 773 as a representative location and a second area 772 containing the second location 774 as a representative location, and the target location 775 may be present within the area 772. If the shortest distance is simply accounted for in such a case, correct geographical name information cannot be acquired. To display a correct geographical name, the area needs to be also considered.

To consider the area, information defining the area needs to be stored on the geographic name information database 700, and it is necessary to determine during indexing which area the target location belongs to. In view of the memory capacity and throughput of the geographic name information database 700, the method of determination needs to be studied beforehand.

Figure 10:
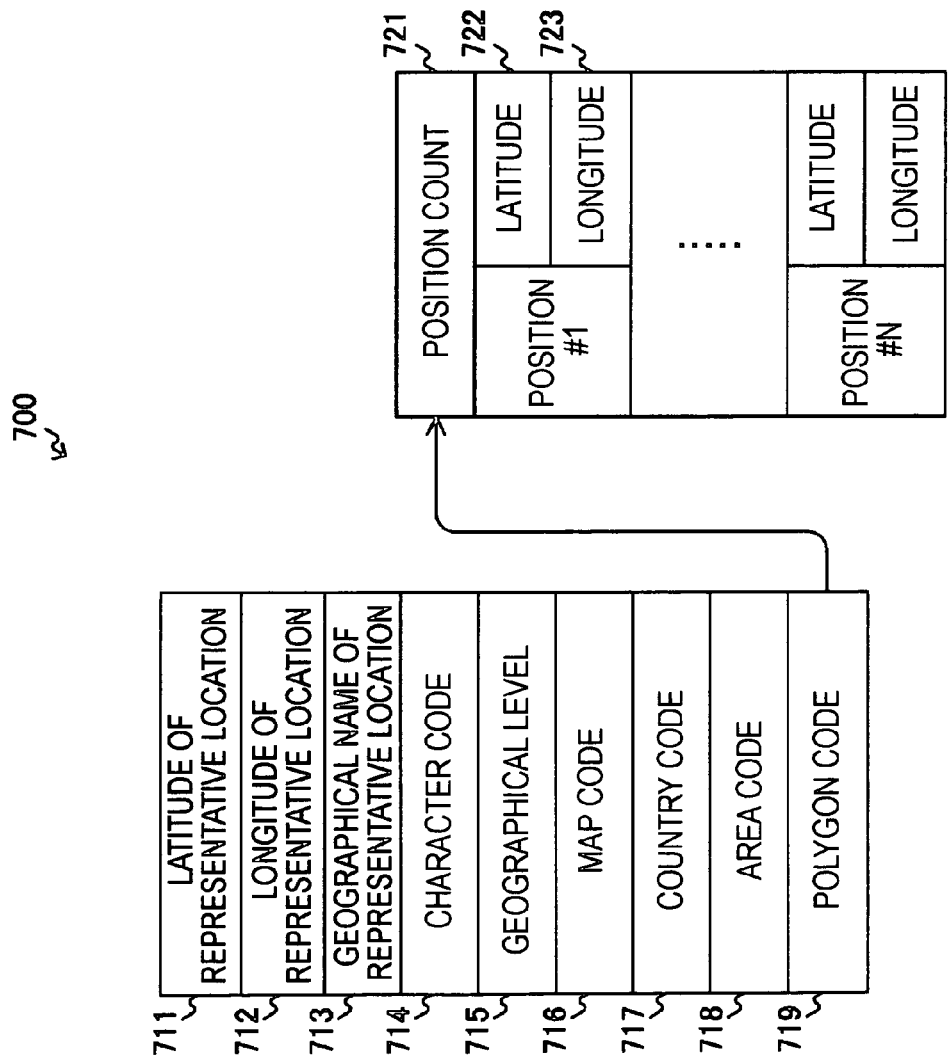
FIG. 10 illustrates a data structure of a geographic name information database in accordance with one embodiment of the present invention.

FIG. 10 illustrates a data structure of the geographic name information database 700 in accordance with one embodiment of the present invention. The geographic name information database 700 herein stores the geographical name information on a per area basis. More specifically, the geographic name information database 700 stores latitude of representative location 711, longitude of representative location 712, geographic name of representative location 713, character code 714, geographical level 715, map code 716, country code 717, area code 718, and polygon code 719.

The latitude of representative location 711 and the longitude of representative location 712 respectively represent the latitude and longitude of a representative location in the area. The geographic name of representative location 713 indicates the geographical name of the representative location in the area. The character code 714 is a character code of the geographic name of representative location 713 (such as shift JIS code). The level 715 indicates the geographical level of the geographic name of representative location 713, such as the state level, city level, etc.

The map code 716 indicates the code of a map within which the area falls. The country code 717 indicates the code of a country, which the area belongs to. The area code 718 indicates the code of a region to which the area belongs to.

The polygon code 719 indicates a link to a polygon group defining the area. The polygon group is defined by N positions (N is an integer). Each position is defined by the latitude 722 and the longitude 723. The position count 721 indicates the number of positions (N).

The geographic name information database 700 compares the latitude and longitude provided by the geographic name information acquisition unit 351 with the latitude 722 and the longitude 723 of each position to determine where the area is located, and supplies the geographical name information of the area to the geographic name information acquisition unit 351.

Figure 11:
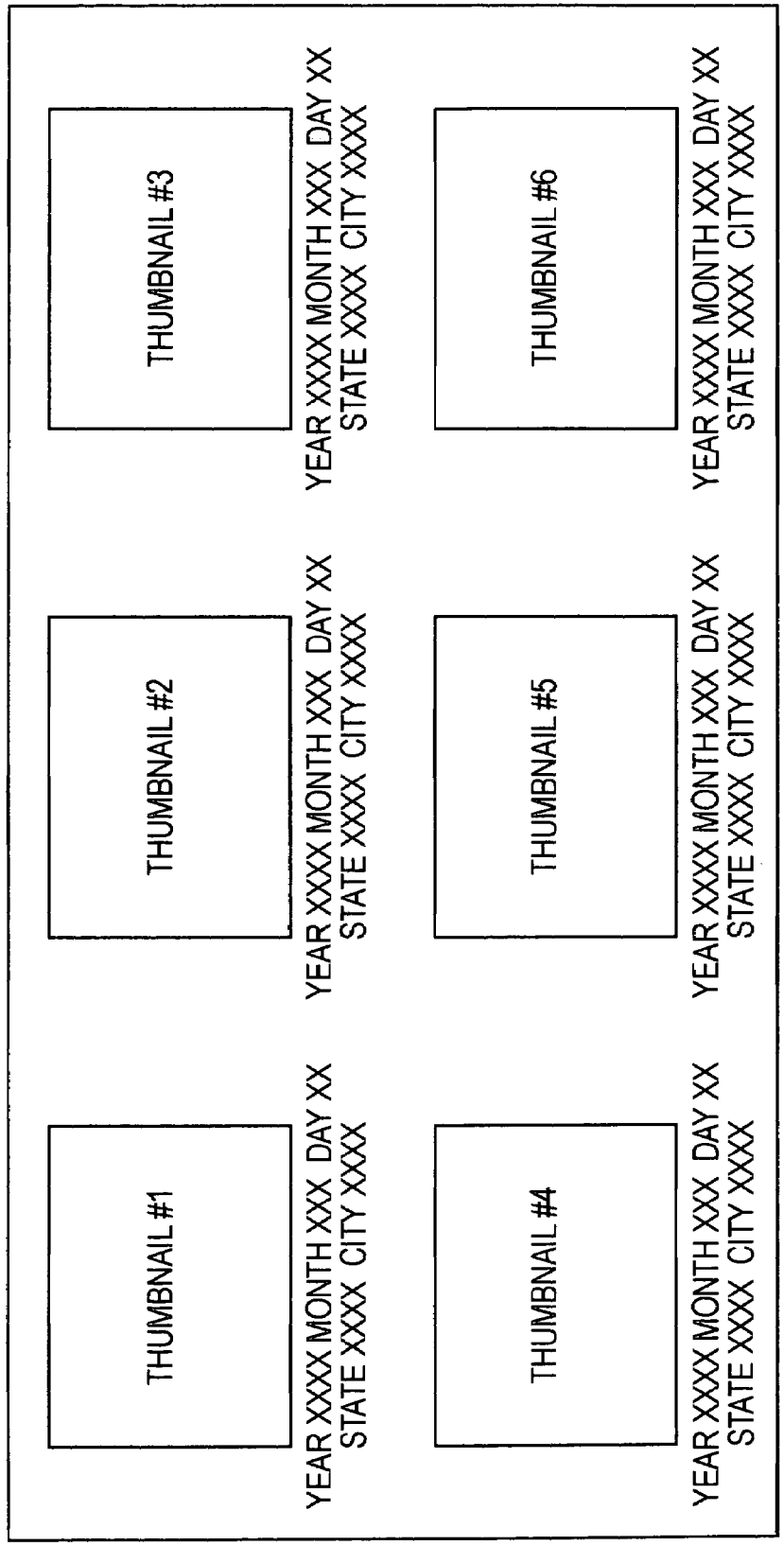
FIG. 11 illustrates a display example of a moving image selection screen in accordance with one embodiment of the present invention.

FIG. 11 illustrates a display example of a moving image selection screen in accordance with one embodiment of the present invention. Six thumbnails are displayed here. Each thumbnail is generated at a change point, and read from the change point thumbnail 532. The thumbnail is tagged with corresponding year, month and day and image pickup position. The image pickup year, month, and day date are read from the change point position information 531, and the image pickup position is acquired by the geographic name information acquisition unit 351 from the geographic name information database 700.

A user points to a desired thumbnail using the operation unit 110, thereby reproducing the moving image from the playback time. In this case, a user interface may specify the moving image by moving a cursor on the display 360 with direction buttons. If the display 360 is implemented in a touchpanel, a thumbnail may be directly specified using a finger or a stylus.

Figure 12:
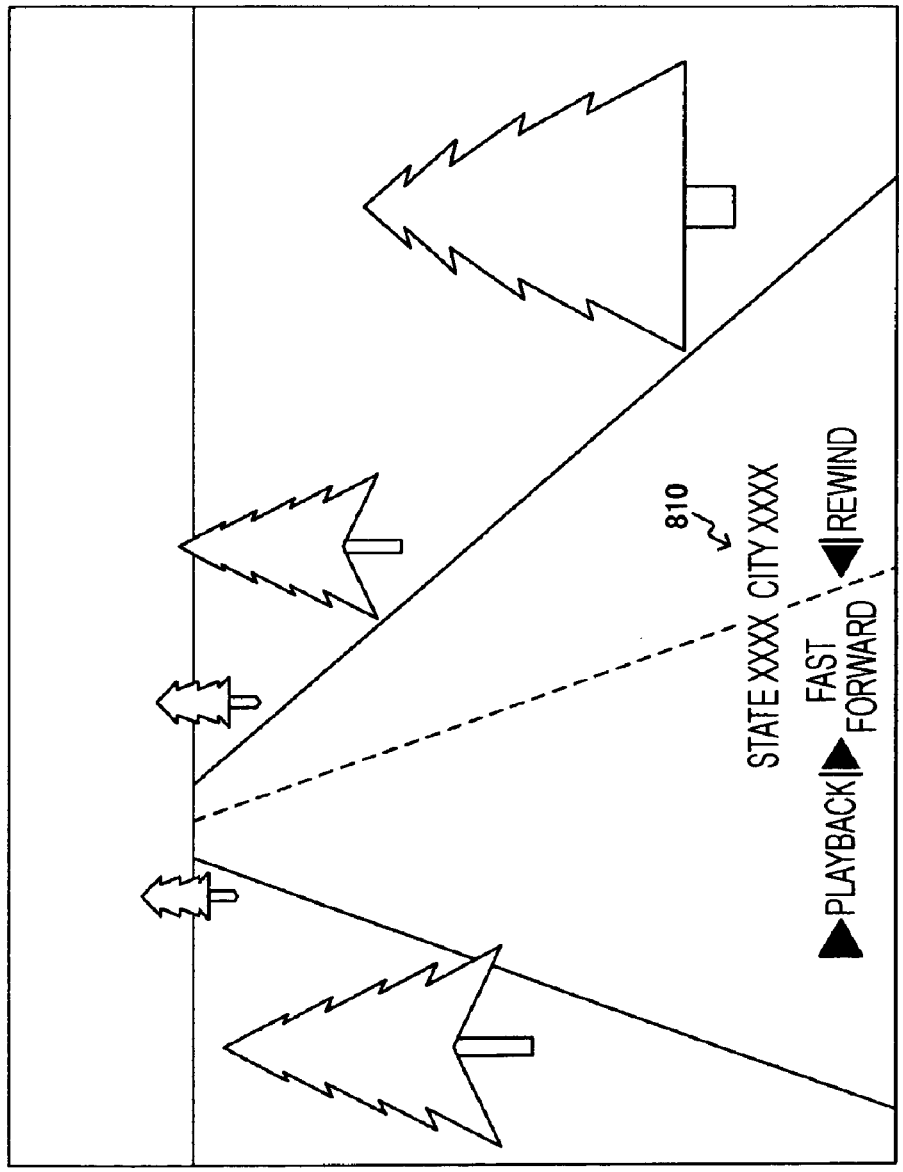
FIG. 12 illustrates a display example of a moving image pre-play screen in accordance with one embodiment of the present invention.

FIG. 12 illustrates a display example of a moving image pre-play screen in accordance with one embodiment of the present invention. If a playback command is issued to reproduce the entire moving image file without any operation on the moving image selection screen of FIG. 11, a front page of the moving image file is displayed as a still image, and the display 360 waits on standby for playback. A geographic name display 810 may present a detailed geographical name corresponding to the front page of the moving image. Alternatively, the geographic name display 810 may present a geographical name of a wide area, indicated in the area code 718, representing a geographical name of the entire moving image file.

The moving image pre-play screen may be called even if a plurality of thumbnails are selected on the moving image selection screen of FIG. 11. When one thumbnail is selected, the moving image pre-play screen may be displayed rather than immediately reproducing the moving image.

Figure 13:
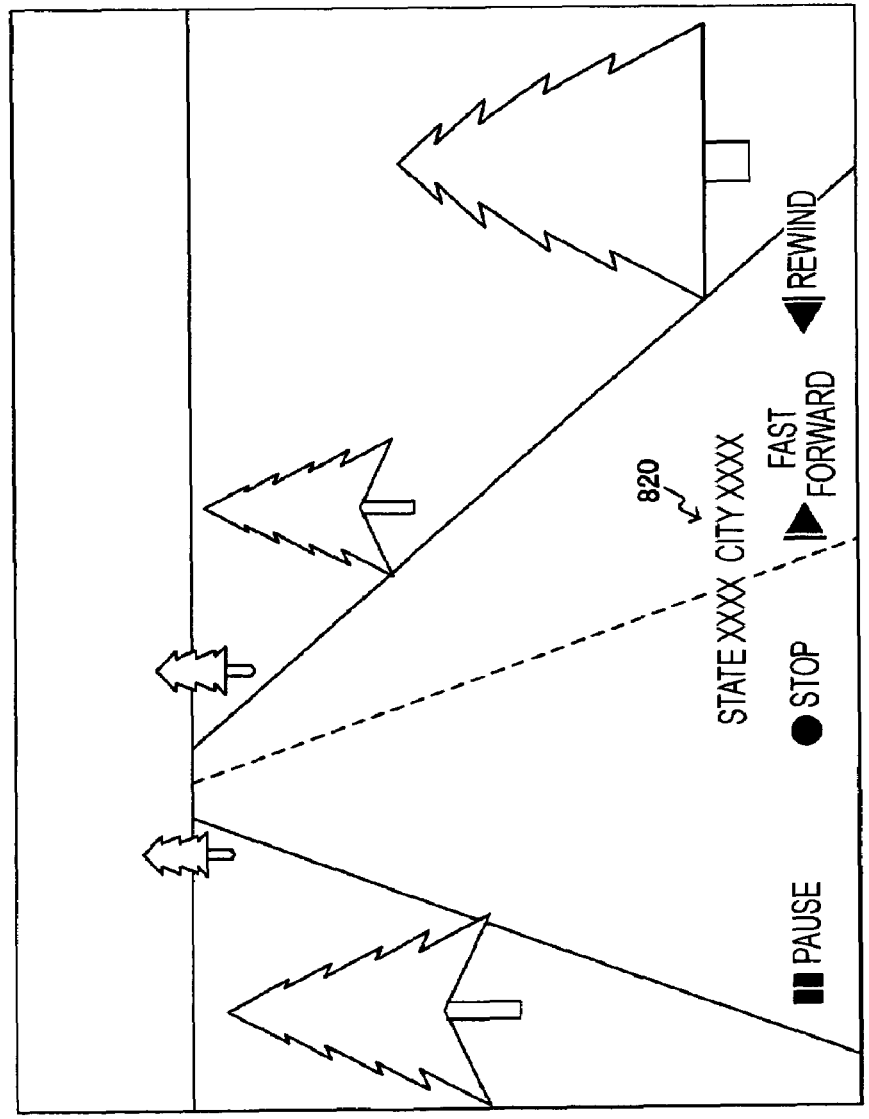
FIG. 13 illustrates a display example of a moving image playback screen in accordance with one embodiment of the present invention.

FIG. 13 illustrates a display example of a moving image playback screen in accordance with one embodiment of the present invention. When the moving image is reproduced, a geographical name display 820 corresponding to the playback time is presented. In response to the geographical name display 820, the position information responsive to the playback time is acquired from the change point position information 531 at regular intervals. When position is shifted with playback being in progress, the corresponding geographical name information is acquired from the geographic name information database 700. The geographical name display 820 matching the progress of the playback is thus presented.

The geographical name display 820 may include the latitude, longitude, altitude, speed, bearing, and image direction contained in the position information.

Figure 14:
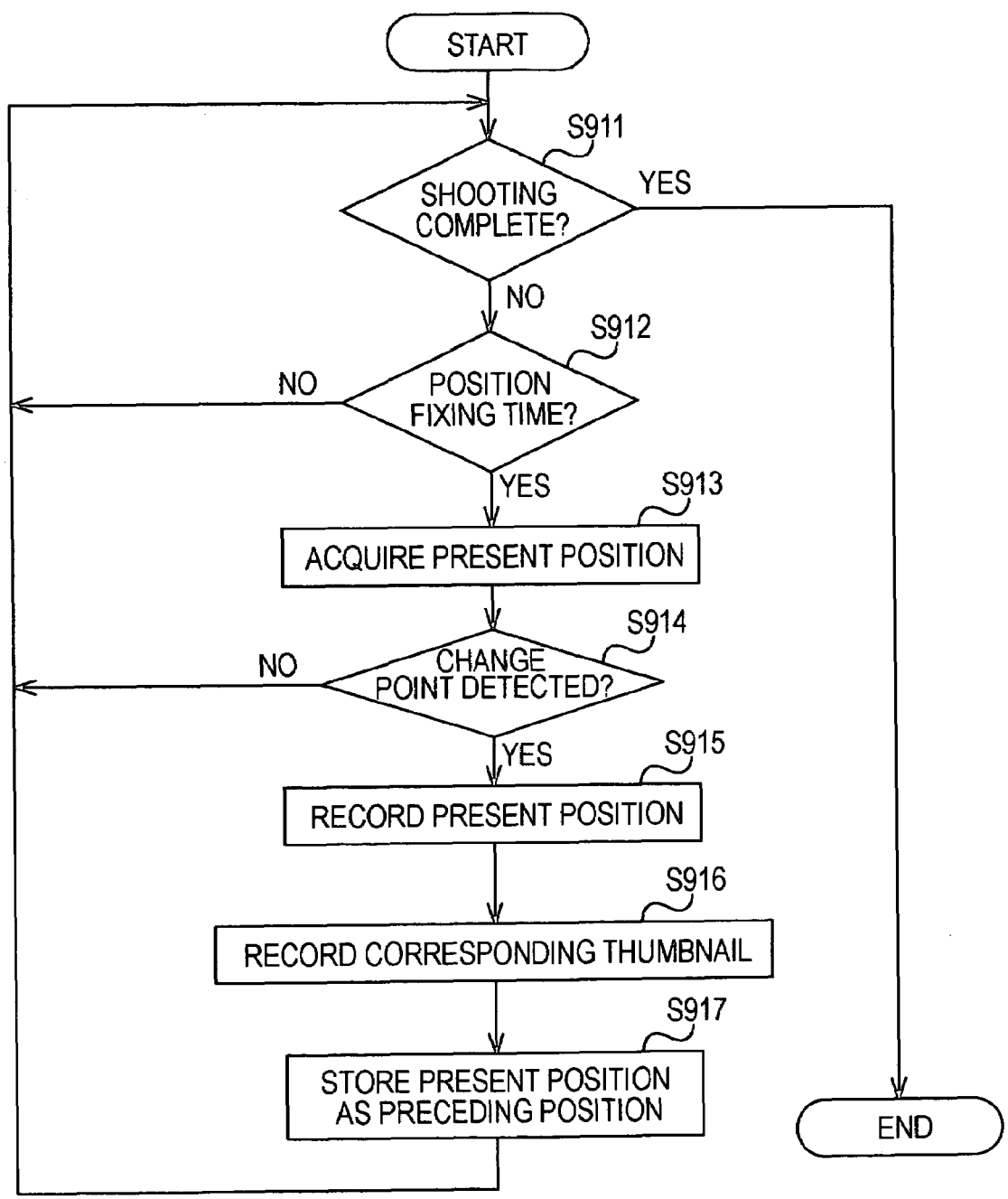
FIG. 14 illustrates a process of moving image recording in accordance with one embodiment of the present invention.

FIG. 14 is a flowchart of a moving image recording process in accordance with one embodiment of the present invention. During the pickup of the moving image, the position fixing timer 250 counts time. When position fixing time comes (step S912), the image pickup position information acquisition unit 220 acquires the position information of the image pickup apparatus 100 (step S913). When the position indicated by the acquired position information has been shifted from the position indicated by the preceding position information, the change point detector 240 detects that position as a "change point" (step S914). The change point may be detected when the position indicated by the position information is spaced apart from the preceding position by a predetermined distance, or when the geographical name becomes different from the preceding geographical name.

When the change point is detected, the acquired position information is recorded onto the change point position information 531 (step S915), and the corresponding thumbnail is recorded onto the change point thumbnail 532 (step S916). The currently acquired position information is stored onto the preceding image pickup position information storage unit 230 as new preceding position information (step S917).

Theses steps are repeated until the image pickup operation is completed (step S911).

Figure 15:
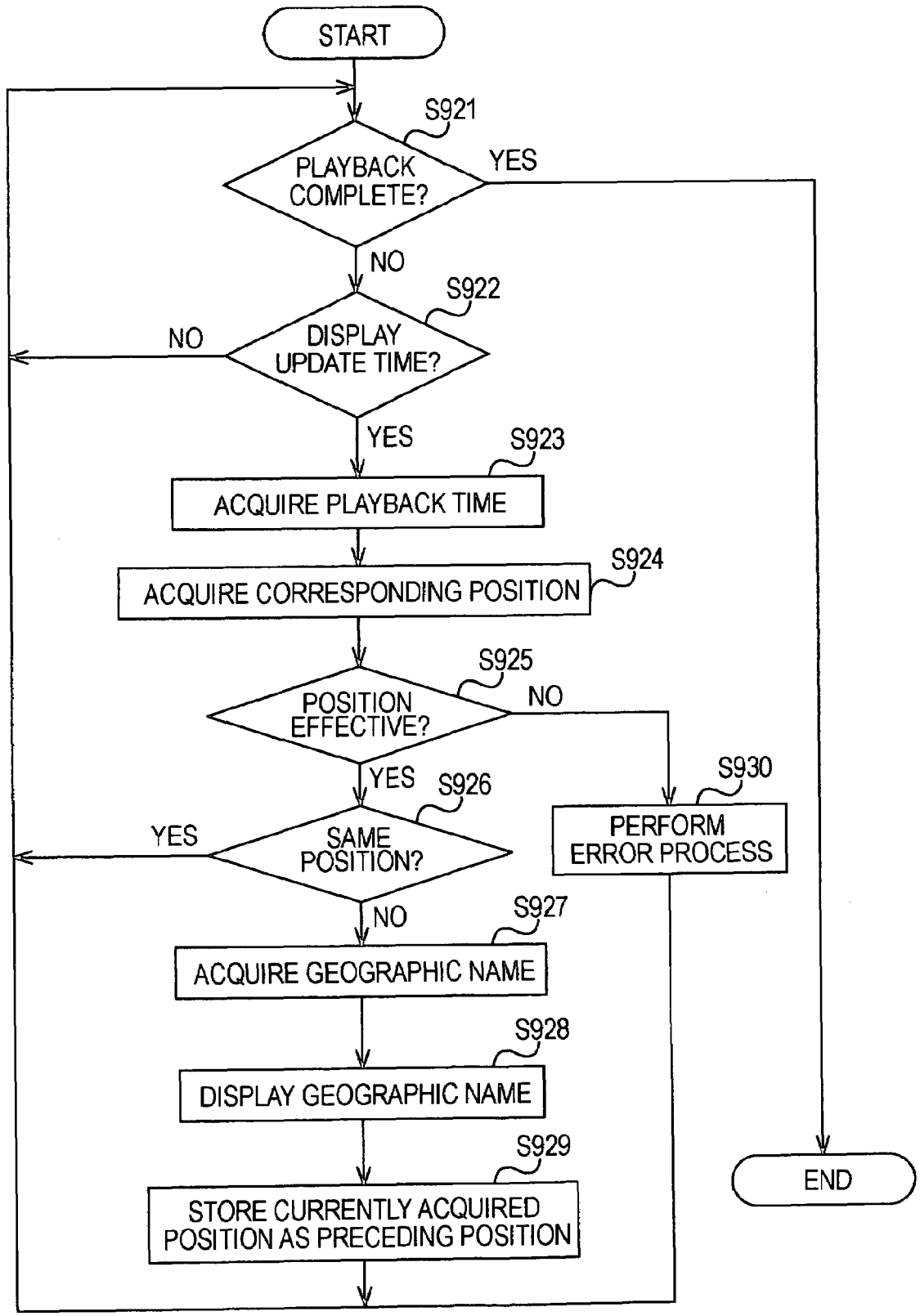
FIG. 15 illustrates a process of moving image playback in accordance with one embodiment of the present invention.

FIG. 15 illustrates a process of moving image playback in accordance with one embodiment of the present invention. While moving image playback is performed, the display update timer 370 counts time. When time to update display comes (step S922), playback time is acquired from the moving image playback unit 310 (step S923), and the playback position information acquisition unit 320 acquires the position information (step S924). If the acquired position information is not valid due to position fixing failure, an error process is performed and the displaying of the geographical name stops (step S930).

When the acquired position information is different from the preceding position information, the corresponding geographical name information is acquired from the geographic name information database 700 (step S927), and the geographical name contained in the geographical name information is displayed (step S928). The currently acquired position information is stored onto the preceding playback position information storage unit 330 as new preceding position information (step S929).

These steps are repeated until the playback of the moving image is completed (step S921).

In accordance with embodiments of the present invention, the change point detector 240 detects the change point of in the position indicated by the position information acquired by the image pickup position information acquisition unit 220, thereby efficiently recording the position information corresponding to the change point. When the position indicated by the position information acquired by the playback position information acquisition unit 320 becomes different from the preceding position as playback is in progress, the geographical name information is acquired from the geographic name information database 700, and the geographical name is correctly displayed during the playback of the moving image.

During the playback of the moving image, the playback position information acquisition unit 320 acquires the change point position information 531 and the playback position information comparator 340 detects the unmatch. The present invention is not limited to this method. If the moving image data recorded with only the position information of the change point associated therewith is reproduced, there is no need for the playback position information comparator 340 to detect the unmatch. The change point of the position information from the associated metadata is simply detected, and the moving image is displayed with the position information overlayed thereon while the position information is switched at the change point.

The embodiments of the present invention have been discussed for exemplary purposes only. As will be discussed below, the elements in each embodiment correspond to the elements in each claim. The present invention is not limited to the correspondence discussed below, and various changes are possible in the correspondence without departing from the scope of the present invention.

For example, the moving image recording unit corresponds to the recorder 150. The image pickup position information acquisition unit corresponds to the image pickup position information acquisition unit 220. The preceding image pickup position information acquisition unit corresponds to the preceding image pickup position information storage unit 230. The change point detecting unit corresponds to the change point detector 240. The change point position information recording unit corresponds to the change point position information 531.

The position measurement timer corresponds to the position fixing timer 250.

The motion status measurement unit corresponds to the speed/acceleration measurement unit 280.

The representative image generating unit corresponds to the thumbnail generator 270. The change point representative image recording unit corresponds to the change point thumbnail 532.

The moving image playback unit corresponds to the moving image playback unit 310. The playback position information acquisition unit corresponds to the playback position information acquisition unit 320. The preceding playback position information storage unit corresponds to the preceding playback position information storage unit 330. The playback position information comparing unit corresponds to the playback position information comparator 340. The geographical name information acquisition unit corresponds to the geographic name information acquisition unit 351. The display unit corresponds to the display 360.

The display update timer corresponds to the display update timer 370.

The geographical name information storage unit corresponds to the geographic name information database 700.

The incidental information storage unit corresponds to the metadata 530. The geographical name information acquisition unit corresponds to the geographic name information acquisition unit 351. The display unit corresponds to the display 360. The operation unit corresponds to the operation unit 110. The moving image playback unit corresponds to the moving image playback unit 310.

The moving image recording unit corresponds to the recorder 150. The image pickup position information acquisition unit corresponds to the image pickup position information acquisition unit 220. The preceding image pickup position information storage unit corresponds to preceding image pickup position information storage unit 230. The change point detecting unit corresponds to the change point detector 240. The change point position information recording unit corresponds to the change point position information 531. The moving image playback unit corresponds to the moving image playback unit 310. The playback position information acquisition unit corresponds to the playback position information acquisition unit 320. The preceding image pickup position information storage unit corresponds to the preceding playback position information storage unit 330. The playback position information comparing unit corresponds to the playback position information comparator 340. The geographical name information acquisition unit corresponds to the geographic name information acquisition unit 351. The display unit corresponds to the display 360.

The moving image recording unit corresponds to the recorder 150. The image pickup position information acquisition unit corresponds to the image pickup position information acquisition unit 220. The preceding image pickup position information storage unit corresponds to the preceding image pickup position information storage unit 230. The change point detecting unit corresponds to the change point detector 240. The change point position information recording unit corresponds to the change point position information 531. The representative image generating unit corresponds to the thumbnail generator 270. The change point representative image recording unit corresponds to the change point thumbnail 532. The geographical name information acquisition unit corresponds to the geographic name information acquisition unit 351. The display unit corresponds to the display 360. The operation unit corresponds to the operation unit 110. The moving image playback unit corresponds to the moving image playback unit 310.

Step S913 corresponds to the step of acquiring, as image pickup position information, position information regarding an image pickup position when a captured image is recorded as moving image data. Step S914 corresponds to the step of detecting a change point indicating that a position represented by the image pickup position information has changed from a position represented by image pickup position information preceding the first image pickup position information, by comparing the image pickup position information with the preceding image pickup position information. Step S915 corresponds to the step of recording, as change point position information, the image pickup position information when the change point is detected.

Step S923 corresponds to the step of acquiring, as playback position information, position information corresponding to playback time of moving image data. Step S926 corresponds to the step of detecting an unmatch by comparing the playback position information with playback position information preceding the first playback position information. Step S927 corresponds to the step of acquiring geographical name information corresponding to the playback position information when the unmatch is detected. Step S928 corresponds to the step of displaying the moving image data together with a geographical name contained in the geographical name information.

The process discussed with reference to the embodiments of the present invention may be considered as a method containing a series of steps. The process may be also considered as a program for causing a computer to perform the series of steps. The program may be stored on a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   moving image recording means for recording a captured image as moving image data;
   image pickup position information acquisition means for acquiring, as image pickup position information, position information regarding an image pickup location during recording of the moving image data;
   preceding image pickup position information storage means for storing, as preceding image pickup position information, the image pickup position information acquired by the image pickup position information acquisition means;
   change point detecting means for detecting a change point indicating that a position represented by the image pickup position information has changed from a position represented by the preceding image pickup position information, by comparing the image pickup position information with the preceding image pickup position information; and
   change point position information recording means for recording, as change point position information, the image pickup position information when the change point is detected,
   wherein the preceding image pickup position storage means stores, as new preceding image pickup position information, the image pickup position information when the change point is detected.

2. The image pickup apparatus according to claim 1, wherein the change point position information is recorded with the moving image data associated therewith.

3. The image pickup apparatus according to claim 1, wherein the change point detecting means detects the change point when a distance between the position represented by the image pickup position information and the position represented by the preceding image pickup position information increases above a predetermined distance.

4. The image pickup apparatus according to claim 1, wherein the change point detecting means detects the change point when a geographic name represented by the image pickup position information becomes different from a geographic name represented by the preceding image pickup position information.

5. The image pickup apparatus according to claim 1, further comprising a position measurement timer for counting a time interval between acquisitions of the image pickup position information,
   wherein the image pickup position information acquisition means acquires the image pickup position information each time the position measurement timer counts the acquisition interval.

6. The image pickup apparatus according to claim 1, further comprising motion status measurement means for measuring a motion status of the image pickup apparatus during image pickup of a moving image, the motion status including information regarding one of a speed and an acceleration of the image pickup apparatus,
   wherein the change point position information recording means records, as a portion of the change point position information, the motion status when the change point is detected.

7. The image pickup apparatus according to claim 1, further comprising representative image generating means for generating, as a representative image, a contracted image of the moving image being picked up when the change point is detected; and
   change point representative image recording means for recording the representative image as a change point representative image.

8. The image pickup apparatus according to claim 7, wherein the change point position information and the change point representative image are recorded, together with the captured moving image data, as information incidental to the moving image data.

9. An image pickup method comprising the steps of:
acquiring, as image pickup position information, position information regarding an image pickup location when a captured image is recorded as moving image data;
storing, as preceding image pickup position information, acquired image pickup position information in a storing device;
detecting a change point indicating that a position represented by the image pickup position information has changed from a position represented by image pickup position information preceding the first image pickup position information, by comparing the image pickup position information with the preceding image pickup position information; and
recording, as change point position information, the image pickup position information when the change point is detected,
wherein the storage device stores, as new preceding image pickup position information, the image pickup position information when the change point is detected.

10. A computer readable recording medium having stored thereon a program for causing a computer to perform the steps of:
acquiring, as image pickup position information, position information regarding an image pickup location when a captured image is recorded as moving image data;
storing, as preceding image pickup position information, acquired image pickup position information in a storing device;
detecting a change point indicating that a position represented by the image pickup position information has changed from a position represented by image pickup position information preceding the first image pickup position information, by comparing the image pickup position information with the preceding image pickup position information; and
recording, as change point position information, the image pickup position information when the change point is detected,
wherein the storage device stores, as new preceding image pickup position information, the image pickup position information when the change point is detected.

11. An image pickup apparatus comprising:
a moving image recording unit recording a captured image as moving image data;
an image pickup position information acquisition unit acquiring, as image pickup position information, position information regarding an image pickup location during recording of the moving image data;
a preceding image pickup position information storage unit storing, as preceding image pickup position information, the image pickup position information acquired by the image pickup position information acquisition unit;
a change point detecting unit detecting a change point indicating that a position represented by the image pickup position information has changed from a position represented by the preceding image pickup position information, by comparing the image pickup position information with the preceding image pickup position information; and
a change point position information recording unit recording, as change point position information, the image pickup position information when the change point is detected,
wherein the preceding image pickup position storage unit stores, as new preceding image pickup position information, the image pickup position information when the change point is detected.

12. An image pickup method comprising the steps of:
acquiring, as image pickup position information, position information regarding an image pickup location when a captured image is recorded as moving image data, in which the position information is geographical information;
detecting a change point indicating that a geographical position represented by the image pickup position information has changed from a geographical position represented by image pickup position information preceding the first image pickup position information, by comparing the image pickup position information with the preceding image pickup position information; and
recording, as change point position information, the image pickup position information when the change point is detected.

13. A computer readable recording medium having stored thereon a program for causing a computer to perform the steps of:
acquiring, as image pickup position information, position information regarding an image pickup location when a captured image is recorded as moving image data, in which the position information is geographical information;
detecting a change point indicating that a geographical position represented by the image pickup position information has changed from a geographical position represented by image pickup position information preceding the first image pickup position information, by comparing the image pickup position information with the preceding image pickup position information; and
recording, as change point position information, the image pickup position information when the change point is detected.

* * * * *